United States Patent
Ng et al.

(10) Patent No.: US 10,183,721 B2
(45) Date of Patent: Jan. 22, 2019

(54) BICYCLE CONTROL DEVICE

(71) Applicant: Shimano Components (Malaysia) SDN. BHD, Pontian, Johor (MY)

(72) Inventors: Chee Keong Ng, Johor (MY); Sui Cheng Ng, Johor (MY)

(73) Assignee: SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 14 days.

(21) Appl. No.: 15/233,370

(22) Filed: Aug. 10, 2016

(65) Prior Publication Data

US 2018/0043962 A1 Feb. 15, 2018

(51) Int. Cl.
| | |
|---|---|
| B62K 23/06 | (2006.01) |
| B62L 3/02 | (2006.01) |
| B62M 25/04 | (2006.01) |
| F15B 7/08 | (2006.01) |

(52) U.S. Cl.
CPC .............. B62K 23/06 (2013.01); B62L 3/023 (2013.01); B62M 25/04 (2013.01); F15B 7/08 (2013.01)

(58) Field of Classification Search
CPC ........ B62K 23/06; B62L 3/023; B62M 25/04; F15B 7/08
See application file for complete search history.

(56) References Cited

U.S. PATENT DOCUMENTS

| | | | |
|---|---|---|---|
| 4,921,081 A | 5/1990 | Chilcote | |
| 6,336,525 B1 | 1/2002 | Leng | |
| 6,957,534 B2 * | 10/2005 | Lumpkin | B62K 23/06 60/588 |
| 7,487,638 B2 | 2/2009 | Tetsuka et al. | |
| 7,650,813 B2 * | 1/2010 | Tsumiyama | B62M 25/04 192/217 |
| 8,061,667 B2 | 11/2011 | Weiss et al. | |
| 8,146,716 B2 | 4/2012 | Siew et al. | |
| 8,695,454 B2 * | 4/2014 | Tsumiyama | B60T 7/102 74/489 |
| 9,321,506 B2 | 4/2016 | Matsueda et al. | |
| 9,365,260 B2 | 6/2016 | Nago | |
| 2007/0131495 A1 | 6/2007 | Matsushita et al. | |
| 2010/0064838 A1 | 3/2010 | Siew et al. | |

(Continued)

FOREIGN PATENT DOCUMENTS

CN 204802006 U 11/2015

*Primary Examiner* — Vicky A Johnson
(74) *Attorney, Agent, or Firm* — Global IP Counselors, LLP

(57) ABSTRACT

A bicycle control device is basically provided with a mounting bracket, a hydraulic unit and a shift unit. The mounting bracket includes a handlebar clamp defining a handlebar mounting axis. The hydraulic unit is provided on the mounting bracket and includes a cylinder housing defining a cylinder bore, a hydraulic reservoir and a piston. The hydraulic reservoir is fluidly connected to the cylinder bore. The piston is movably disposed in the cylinder bore along a cylinder axis of the cylinder bore. The shift unit is provided on the mounting bracket and includes a wire take-up member pivotable about a take-up axis. The wire take-up member of the shift unit and the hydraulic reservoir are disposed between the handlebar mounting axis and the cylinder axis as viewed along a first direction parallel to the take-up axis of the wire take-up member.

33 Claims, 9 Drawing Sheets

(56) References Cited

U.S. PATENT DOCUMENTS

| | | |
|---|---|---|
| 2011/0240425 A1 | 10/2011 | Hirose et al. |
| 2012/0160625 A1 | 6/2012 | Jordan |
| 2012/0240715 A1 | 9/2012 | Tsai |
| 2014/0026710 A1* | 1/2014 | Takeuchi ............... B62K 23/06 74/551.8 |
| 2014/0354038 A1* | 12/2014 | Kosaka ................. B62M 25/08 307/9.1 |
| 2015/0000455 A1* | 1/2015 | Hirotomi ............... B62K 23/06 74/491 |

* cited by examiner

BICYCLE CONTROL DEVICE

BACKGROUND

Field of the Invention

This invention generally relates to a bicycle control device. More specifically, the present invention relates to a bicycle control device that includes a hydraulic unit and a shift unit.

Background Information

Most bicycles have bicycle control devices to operate various bicycle components that perform such functions as shifting gears and/or braking. Some bicycle control devices combine both shifting and braking functions into a single unit. For example, U.S. Pat. No. 8,695,454 and U.S. Pat. No. 9,321,506 both disclose a bicycle control device that combines both shifting and braking functions into a single unit. In these U.S. patents, a mechanical shift unit is provided for performing the shifting function and a hydraulic unit is provided for performing the braking function.

SUMMARY

Generally, the present disclosure is directed to various features of a bicycle control device that is configured to perform both shifting and braking functions.

One aspect is to provide a bicycle control device that is relatively compact and relatively economical to manufacture.

In view of the state of the known technology and in accordance with a first aspect of the present disclosure, a bicycle control device is basically provided that comprises a mounting bracket, a hydraulic unit and a shift unit. The mounting bracket includes a handlebar clamp defining a handlebar mounting axis. The hydraulic unit is provided on the mounting bracket and includes a cylinder housing defining a cylinder bore, a hydraulic reservoir and a piston. The hydraulic reservoir is fluidly connected to the cylinder bore. The piston is movably disposed in the cylinder bore along a cylinder axis of the cylinder bore. The shift unit is provided on the mounting bracket and includes a wire take-up member pivotable about a take-up axis. The wire take-up member of the shift unit and the hydraulic reservoir are disposed between the handlebar mounting axis and the cylinder axis as viewed along a first direction parallel to the take-up axis of the wire take-up member. According to the first aspect of the present invention, the wire take-up member and the hydraulic reservoir are located such that the bicycle control device is relatively compact.

In accordance with a second aspect of the present invention, a bicycle control device is basically provided that comprises a mounting bracket, a hydraulic unit and a shift unit. The hydraulic unit is provided on the mounting bracket. The hydraulic unit includes a cylinder housing, a hydraulic reservoir, a piston and a hydraulic operating lever. The cylinder housing defines a cylinder bore. The hydraulic reservoir is fluidly connected to the cylinder bore. The piston is movably disposed in the cylinder bore along a cylinder axis of the cylinder bore. The hydraulic operating lever is movably disposed along a hydraulic operating plane to move the piston within the cylinder bore. The shift unit is provided on the mounting bracket. The hydraulic operating plane passes through the cylinder bore, the hydraulic reservoir and the shift unit. According to the second aspect of the present invention, the bicycle control device is configured so as to be relatively compact.

In accordance with a third aspect of the present invention, the bicycle control device according to the second aspect is configured so that the shift unit includes a main axle defining a take-up axis, and a wire take-up member pivotable about the take-up axis, and the hydraulic operating plane intersects with the main axle. According to the third aspect of the present invention, the bicycle control device is configured so as to be relatively compact.

In accordance with a fourth aspect of the present invention, the bicycle control device according to the second or third aspect is configured so that the mounting bracket includes a handlebar clamp defining a handlebar receiving opening with a handlebar mounting axis, and the hydraulic operating plane passes through the cylinder bore, the hydraulic reservoir and the shift unit. According to the fourth aspect of the present invention, the bicycle control device is configured so as to be relatively compact.

In accordance with a fifth aspect of the present invention, a bicycle control device is basically provided that comprises a mounting bracket, a shift unit and a hydraulic unit. The shift unit includes a first operating lever movably disposed along a first operating plane and a second operating lever movably disposed along a second operating plane. The hydraulic unit includes a cylinder housing defining a cylinder bore provided to the mounting bracket, a hydraulic reservoir, and a fluid passage fluidly connecting the cylinder bore to the hydraulic reservoir. The fluid passage is disposed between the first operating plane and the second operating plane without intersecting with at least one of the first operating plane and the second operating plane. According to the fifth aspect of the present invention, the bicycle control device is configured so as to be relatively compact.

In accordance with a sixth aspect of the present invention, the bicycle control device according to the fifth aspect is configured so that the fluid passage includes a first portion having a first diameter and a second portion having a second diameter, the first diameter is smaller than the second diameter. According to the sixth aspect of the present invention, the bicycle control device is configured such that the bleeding process can be reliably carried out.

In accordance with a seventh aspect of the present invention, the bicycle control device according to the sixth aspect is configured so that the first portion is disposed closer to the cylinder bore than the second portion. According to the seventh aspect of the present invention, the bicycle control device is configured such that the bleeding process can be more reliably carried out.

In accordance with an eighth aspect of the present invention, the bicycle control device according to the sixth or seventh aspect is configured so that the first portion defines a first axis and the second portion defines a second axis extending in a same direction as the first axis, and the first axis of the first portion is located closer to the cylinder bore than the second axis of the second portion. According to the eighth aspect of the present invention, the bicycle control device is configured such that the bleeding process can be more reliably carried out.

In accordance with a ninth aspect of the present invention, the bicycle control device according to any one of the sixth to eighth aspects is configured so that the first axis is parallel to the second axis and offset from the second axis. According to the ninth aspect of the present invention, the bicycle control device is configured such that the bleeding process can be more reliably carried out.

In accordance with a tenth aspect of the present invention, a bicycle control device is basically provided that comprises a mounting bracket, a hydraulic unit and a shift unit. The hydraulic unit includes a cylinder housing, a hydraulic reservoir and a piston. The cylinder housing defines a cylinder bore provided to the mounting bracket. The hydraulic reservoir is fluidly connected to the cylinder bore. The piston is movably disposed in the cylinder bore. The shift unit includes a first operating lever movably disposed along a first operating plane and a second operating lever movably disposed along a second operating plane. A majority of the hydraulic reservoir is disposed between the first operating plane and the second operating plane. According to the tenth aspect of the present invention, the bicycle control device is configured so as to be relatively compact.

In accordance with an eleventh aspect of the present invention, the bicycle control device according to any one of the first to tenth aspects is configured so that the handlebar mounting axis is not parallel to the cylinder axis. According to the eleventh aspect of the present invention, the handlebar mounting axis is not parallel to the cylinder axis so that sufficient space can be provided for the shift unit without compromising the compactness of the bicycle control device.

In accordance with a twelfth aspect of the present invention, the bicycle control device according to the eleventh aspect is configured so that the cylinder axis diverges away from the handlebar mounting axis as the cylinder axis extends in a second direction away from the handlebar clamp. According to the twelfth aspect of the present invention, the cylinder axis diverges away from the handlebar mounting axis as the cylinder axis extends in a second direction away from the handlebar clamp so that sufficient space can be provided for the shift unit without compromising the compactness of the bicycle control device.

In accordance with a thirteenth aspect of the present invention, the bicycle control device according to any one of the first to twelfth aspects is configured so that the hydraulic unit further includes a hydraulic operating lever movably disposed along a hydraulic operating plane to move the piston within the cylinder bore. According to the thirteenth aspect of the present invention, a hydraulic operating lever is provided for easy operation of the piston within the cylinder bore.

In accordance with a fourteenth aspect of the present invention, the bicycle control device according to the thirteenth aspect is configured so that the shift unit includes a first operating lever movably disposed along a first operating plane, and a second operating lever movably disposed along a second operating plane. The hydraulic operating plane is disposed closer to the first operating plane than the second operating plane. According to the fourteenth aspect of the present invention, the bicycle control device is configured so as to be relatively compact.

In accordance with a fifteenth aspect of the present invention, the bicycle control device according to the fourteenth aspect is configured so that the second operating plane is parallel to the first operating plane. According to the fifteenth aspect of the present invention, the bicycle control device is configured so as to be relatively compact.

In accordance with a sixteenth aspect of the present invention, the bicycle control device according to any one of the thirteenth to fifteenth aspects is configured so that the hydraulic operating plane passes through the cylinder bore and the hydraulic reservoir. According to the sixteenth aspect of the present invention, the hydraulic operating plane passes through the cylinder bore and the hydraulic reservoir such that the bicycle control device is relatively compact.

In accordance with a seventeenth aspect of the present invention, the bicycle control device according to any one of the twelfth to sixteenth aspects is configured so that the hydraulic operating plane passes through the shift unit. According to the seventeenth aspect of the present invention, the hydraulic operating plane passes through the shift unit such that the bicycle control device is relatively compact.

In accordance with an eighteenth aspect of the present invention, the bicycle control device according to any one of the twelfth to seventeenth aspects is configured so that the hydraulic operating plane passes through a handlebar receiving opening defined by the handlebar clamp. According to the eighteenth aspect of the present invention, the hydraulic operating plane passes through the handlebar receiving opening such that the hydraulic operating lever is easy to operate from the handlebar.

In accordance with a nineteenth aspect of the present invention, the bicycle control device according to any one of the first to eighteenth aspects is configured so that the shift unit includes a first operating lever movably disposed along a first operating plane, and a second operating lever movably disposed along a second operating plane, and the hydraulic reservoir is at least partially disposed between the first operating plane and the second operating plane. According to the nineteenth aspect of the present invention, the first and second operating levers are arranged to easily operate the shift unit and to provide a compact structure.

In accordance with a twentieth aspect of the present invention, the bicycle control device according to the nineteenth aspect is configured so that the cylinder bore is at least partially disposed between the first operating plane and the second operating plane. According to the twentieth aspect of the present invention, the first and second operating planes are arranged for convenient operation of the shift unit from the handlebar.

In accordance with a twenty-first aspect of the present invention, the bicycle control device according to the twentieth aspect is configured so that a majority of the hydraulic reservoir and at least half of the cylinder bore are disposed between the first operating plane and the second operating plane. According to the twenty-first aspect of the present invention, the hydraulic reservoir and the cylinder bore are arranged for providing a compact arrangement.

In accordance with a twenty-second aspect of the present invention, the bicycle control device according to any one of the nineteenth to twenty-first aspects is configured so that the first operating lever is pivotally disposed about a first operating axis, and the second operating lever is pivotally disposed about a second operating axis that is offset from the first operating axis of the first operating lever. According to the twenty-second aspect of the present invention, the first and second operating levers are arranged to simplify the structure of the shift unit.

In accordance with a twenty-third aspect of the present invention, the bicycle control device according to the twenty-second aspect is configured so that the first operating axis is coincident with a take-up axis of the wire take-up member. According to the twenty-third aspect of the present invention, the first operating lever is arranged to simplify the structure of the shift unit.

In accordance with a twenty-fourth aspect of the present invention, the bicycle control device according to any one of the first to twenty-third aspects is configured so that the mounting bracket further includes a shift unit support portion that pivotally supports the wire take-up member. According to the twenty-fourth aspect of the present invention, the shift unit support portion is provided as part of the mounting bracket to decrease manufacturing costs of bicycle control device.

In accordance with a twenty-fifth aspect of the present invention, the bicycle control device according to the twenty-fourth aspect is configured so that the mounting bracket is a one-piece member that defines the shift unit support portion and the cylinder housing. According to the twenty-fifth aspect of the present invention, the shift unit support portion and the cylinder housing are integrally formed as a part of the mounting bracket to decrease manufacturing costs of bicycle control device.

In accordance with a twenty-sixth aspect of the present invention, the bicycle control device according to the twenty-fifth aspect is configured so that the mounting bracket is a one-piece member that further defines the hydraulic reservoir. According to the twenty-sixth aspect of the present invention, the hydraulic reservoir is integrally formed as a part of the mounting bracket to decrease manufacturing costs of bicycle control device.

In accordance with a twenty-seventh aspect of the present invention, the bicycle control device according to the twenty-fifth or twenty-sixth aspect is configured so that the mounting bracket is a one-piece member that further defines the handlebar clamp. According to the twenty-seventh aspect of the present invention, the handlebar clamp is integrally formed as a part of the mounting bracket to decrease manufacturing costs of bicycle control device.

In accordance with a twenty-eighth aspect of the present invention, the bicycle control device according to any one of the first to twenty-seventh aspects is configured so that the mounting bracket includes a bleed port that is fluidly connected to the hydraulic reservoir. According to the twenty-eighth aspect of the present invention, the bleed port is provided such that a bleeding process becomes easy to carry out.

In accordance with a twenty-ninth aspect of the present invention, the bicycle control device according to the twenty-eighth aspect is configured so that the bleed port is entirely disposed between the handlebar mounting axis and the cylinder axis as viewed along the first direction. According to the twenty-ninth aspect of the present invention, the bleed port is provided in a convenient place for a rider to carry out the bleeding process.

In accordance with a thirtieth aspect of the present invention, the bicycle control device according to the twenty-eighth or twenty-ninth aspect is configured so that the shift unit includes a cover attached to the mounting bracket to house the wire take-up member, and to overlie the bleed port. According to the thirtieth aspect of the present invention, the cover is provided to provide an attractive appearance.

In accordance with a thirty-first aspect of the present invention, the bicycle control device according to any one of the first to thirtieth aspects further comprises a reservoir lid closing an opening of the hydraulic reservoir. According to the thirty-first aspect of the present invention, the reservoir lid is provided so that the hydraulic reservoir can be easily formed.

In accordance with a thirty-second aspect of the present invention, the bicycle control device according to the thirty-first aspect further comprises a diaphragm at least partially disposed between the hydraulic reservoir and the reservoir lid to divide the hydraulic reservoir into an air chamber and a hydraulic fluid chamber. According to the thirty-second aspect of the present invention, the bicycle control device is configured such that the hydraulic reservoir can more effectively isolate air from the hydraulic fluid by using a diaphragm.

In accordance with a thirty-third aspect of the present invention, the bicycle control device according to the thirty-first or thirty-second aspect is configured so that the reservoir lid has an air passageway connecting the air chamber to outside of the mounting bracket. According to the thirty-third aspect of the present invention, the bicycle control device is configured such that the air chamber works effectively.

Also other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure.

DETAILED DESCRIPTION OF EMBODIMENTS

Figure 1:
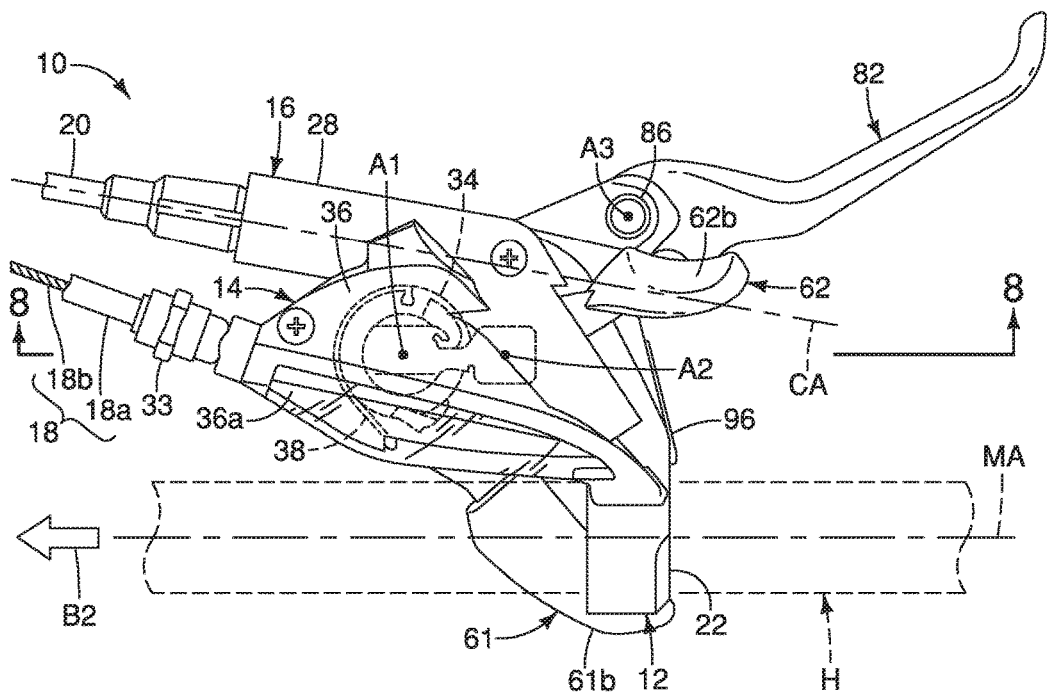
FIG. 1 is a top view of a bicycle control device having a shift unit and a hydraulic unit provided to a mounting bracket that is mounted to a portion of a bicycle handlebar in accordance with one illustrated embodiment.
Figure 2:
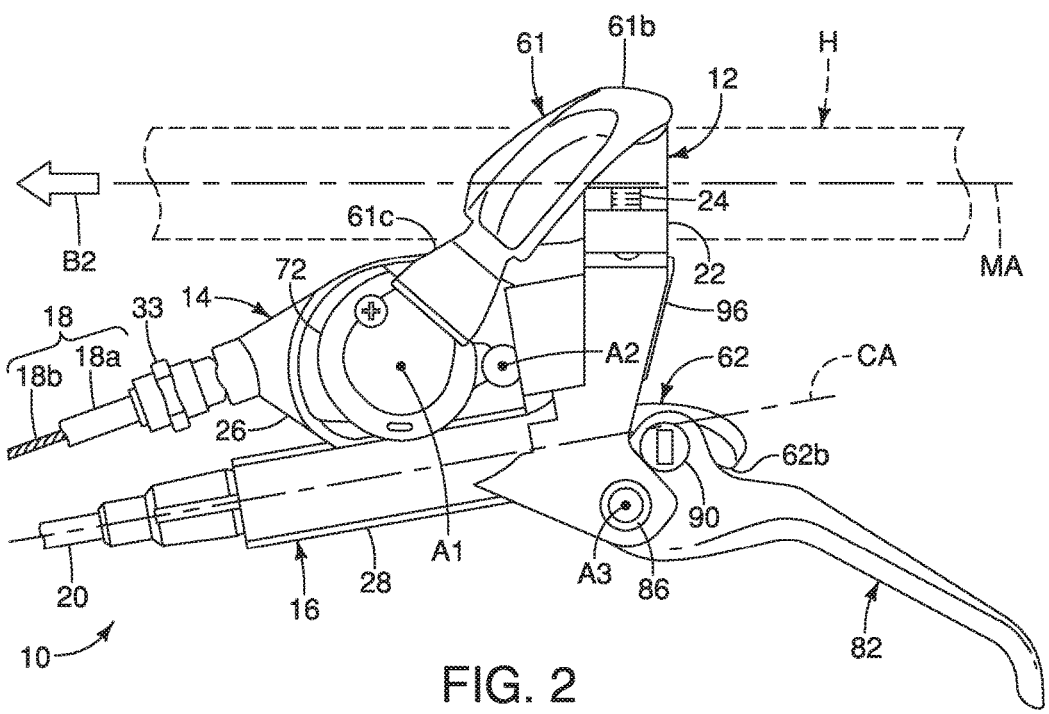
FIG. 2 is a bottom view of the bicycle control device and the portion of the bicycle handlebar illustrated in FIG. 1.
Figure 3:
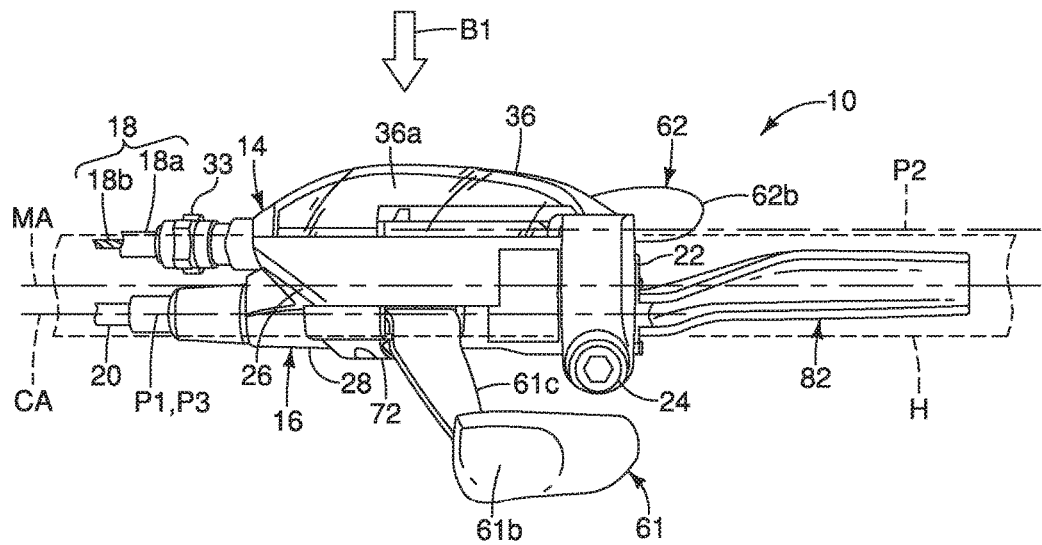
FIG. 3 is a rider facing side elevational view of the bicycle control device and the portion of the bicycle handlebar illustrated in FIGS. 1 and 2.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1 to 5, a bicycle control device 10 is illustrated in accordance with a first embodiment. Here, the bicycle control device 10 is mounted to a portion of a bicycle handlebar H. The bicycle control device 10 is basically provided that comprises a mounting bracket 12, a shift unit 14 and a hydraulic unit 16. The bicycle control device 10 is a right hand side control device that is operated by the rider's right hand to selectively operate a gear shifting device (not shown, e.g., a cable operated derailleur) and a brake device (not shown, e.g., a hydraulic disc brake caliper). The shift unit 14 is operatively coupled to a gear shifting device via a control cable 18, while the hydraulic unit 16 is operatively coupled to a brake device via a hydraulic hose 20. The control cable 18 and the hydraulic hose 20 are conventional structures commonly used in the bicycle field. The control cable 18 has an outer casing 18a covering an inner wire 18b.

It will be apparent to those skilled in the bicycle field that the configuration of the bicycle control device 10 can be adapted to a left hand side control device that is operated by the rider's left hand. A left hand side control device is essentially identical to the bicycle control device 10, except that the left hand side control device is a mirror image of the bicycle control device 10, and the left hand side control device may be configured to have a different number of shift operations as compared to the bicycle control device 10. Thus, for the sake of brevity, only the bicycle control device 10 (i.e., a right hand side control device) will be discussed and illustrated herein.

Figure 4:
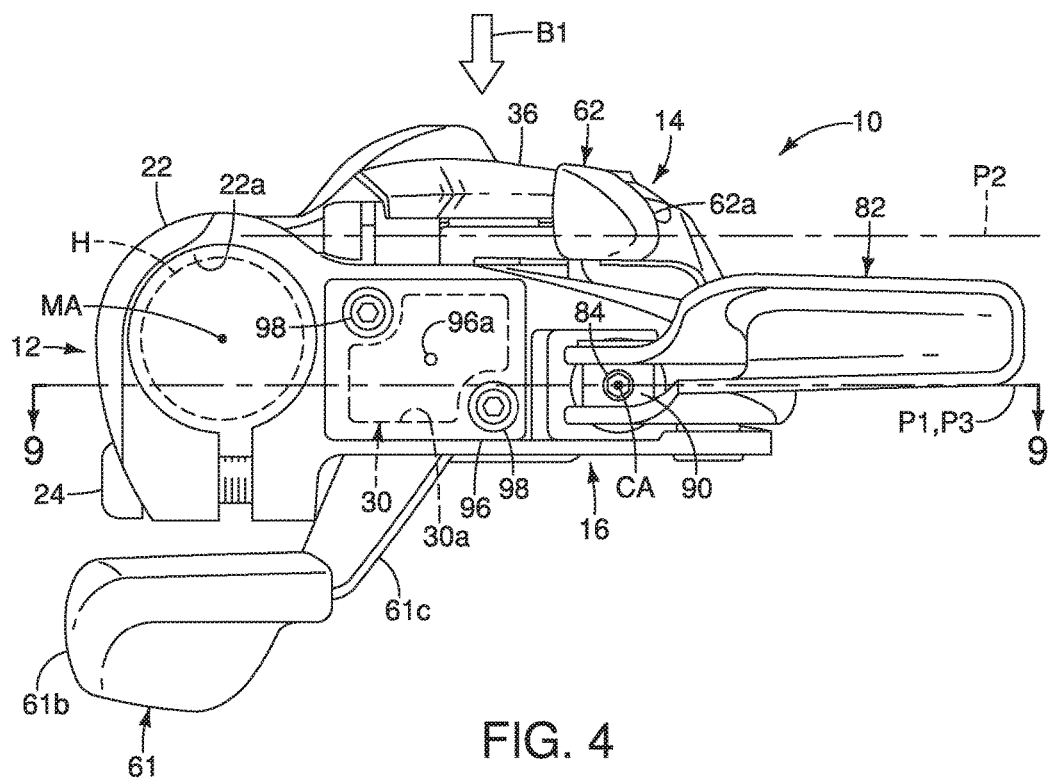
FIG. 4 is an outside facing side elevational view of the bicycle control device and the portion of the bicycle handlebar illustrated in FIGS. 1 to 3.
Figure 5:
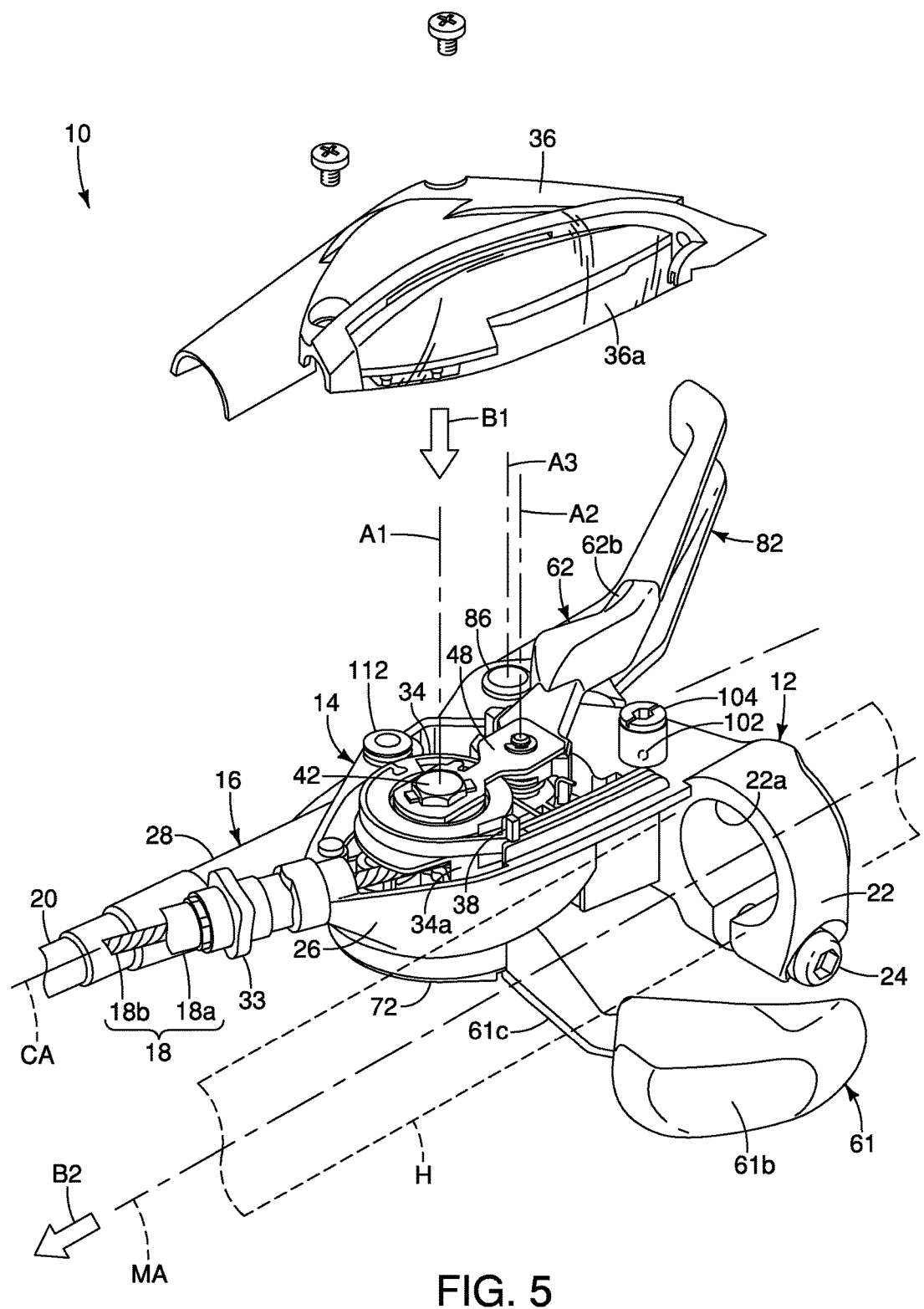
FIG. 5 is a partial exploded perspective view of the bicycle control device and the portion of the bicycle handlebar illustrated in FIGS. 1 to 4.

The mounting bracket 12 will now be discussed. In the illustrated embodiment, the mounting bracket 12 includes a handlebar clamp 22 defining a handlebar mounting axis MA as seen in FIGS. 1 to 5. Here, in the illustrated embodiment, the handlebar clamp 22 defines a handlebar receiving opening 22a with the handlebar mounting axis MA as seen in FIGS. 4 and 5. Thus, the handlebar clamp 22 is configured to be mounted to the bicycle handlebar H of a bicycle. The handlebar clamp 22 constitutes an example of a handlebar mounting member. Here, as seen in FIGS. 4 and 5, a tightening bolt 24 is provided to the handlebar clamp 22 to form a tube clamp that is configured to squeeze the handlebar clamp 22 onto the bicycle handlebar H. The mounting bracket 12 is made of a suitable rigid, hard material such as a hard plastic material (e.g., resin), a fiber reinforced plastic material (e.g., resin), a metallic material, etc. For example, the mounting bracket 12 can be injection molded or can be casted from a metallic material, etc. The mounting bracket 12 is a one-piece member that defines the handlebar clamp 22.

Figure 6:
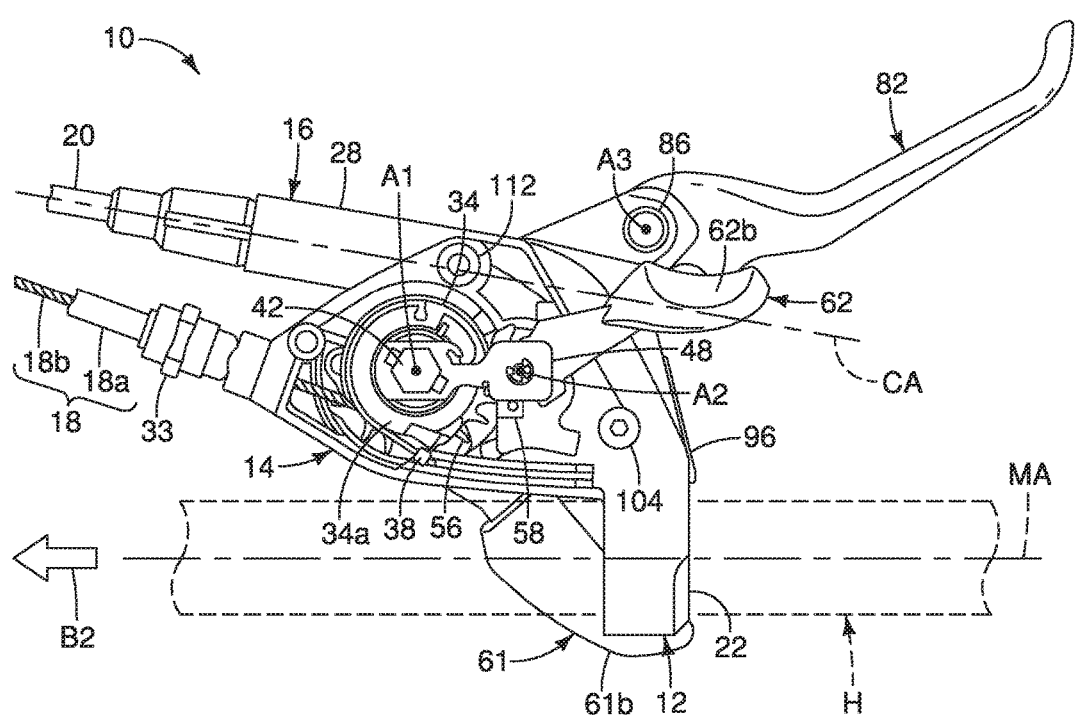
FIG. 6 is a top view of the bicycle control device illustrated in FIGS. 1 to 4, but with a cover removed to expose a bleed port that is fluidly connected to a hydraulic reservoir of the hydraulic unit.
Figure 7:
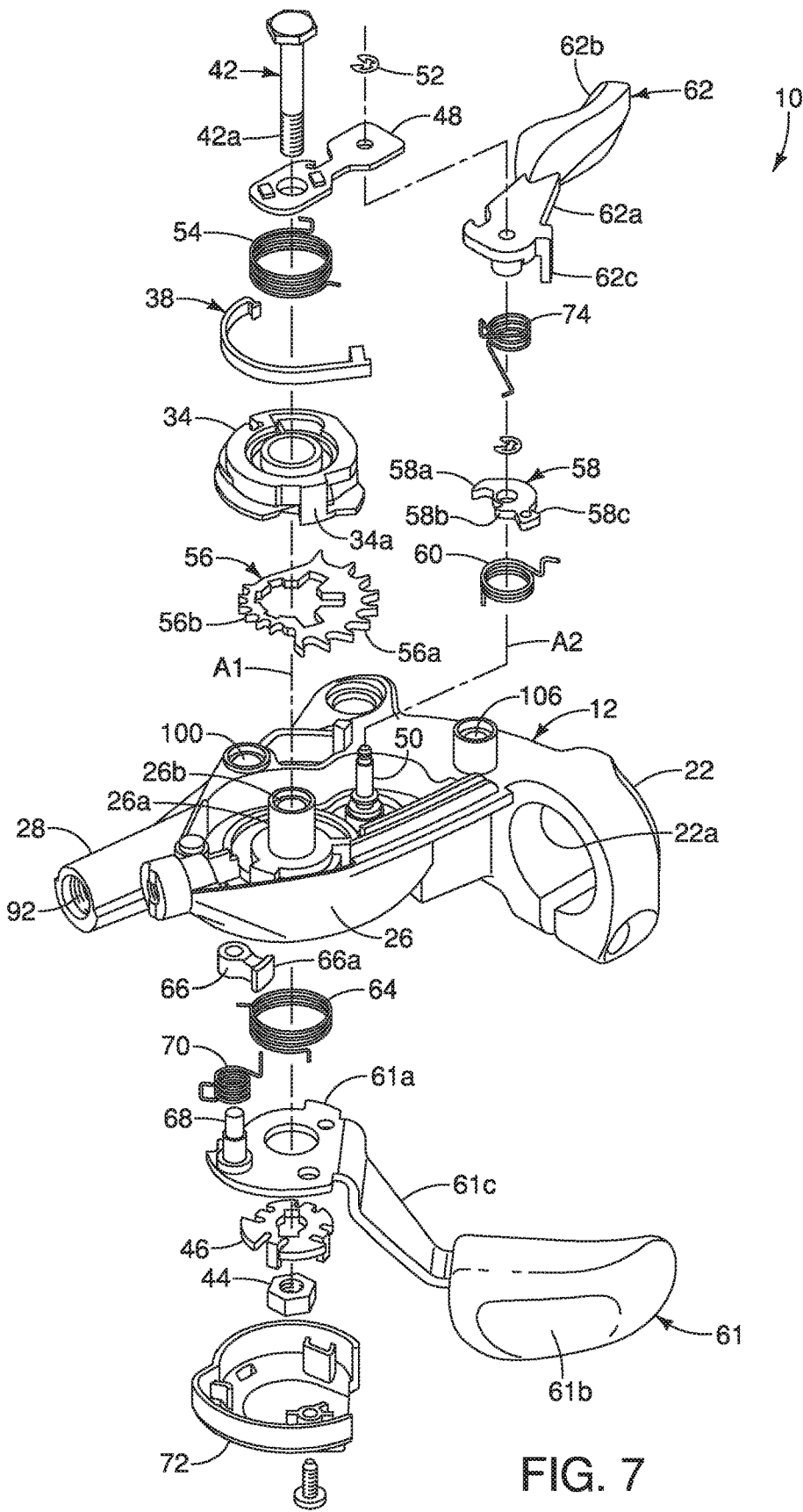
FIG. 7 is an exploded perspective view of the bicycle control device illustrated in FIGS. 1 to 4.
Figure 8:
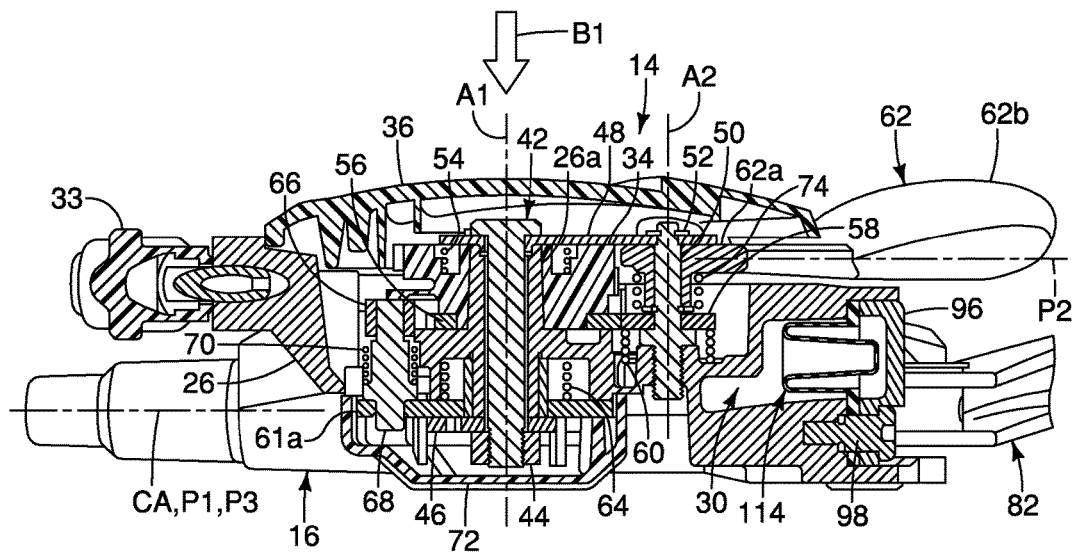
FIG. 8 is a cross sectional view of the bicycle control device as seen along section line 8-8 of FIG. 1.
Figure 9:
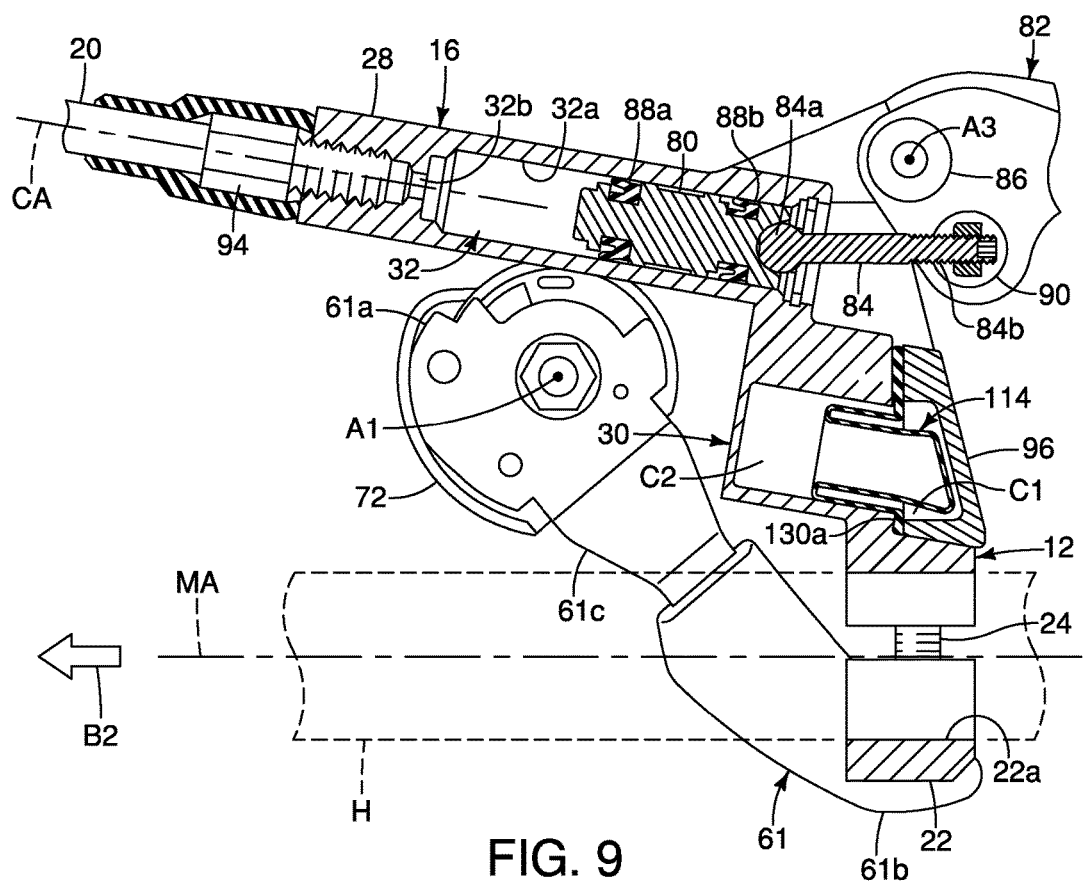
FIG. 9 is a cross sectional view of the bicycle control device as seen along section line 9-9 of FIG. 4.
Figure 11:
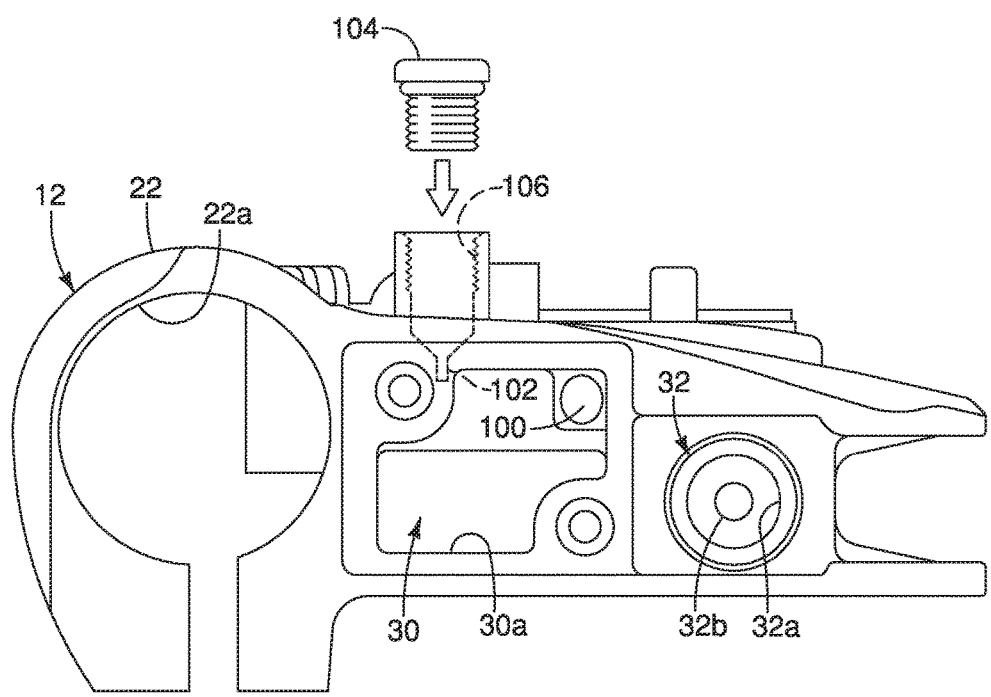
FIG. 11 is an outside facing side elevational view of the mounting bracket of the bicycle control device illustrated in FIGS. 1 to 4, in which the shift unit has been removed, and in which various parts of the hydraulic unit have been removed.
Figure 12:
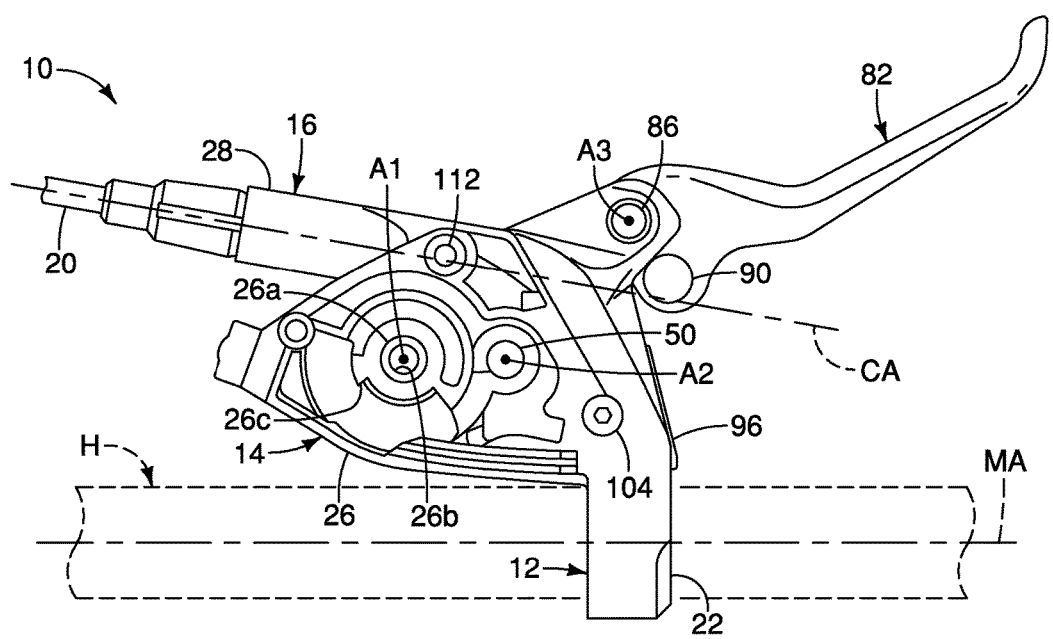
FIG. 12 is a top view of the mounting bracket of the bicycle control device illustrated in FIGS. 1 to 4, in which a shift unit support portion of the shift unit and a cylinder housing and a hydraulic reservoir of the hydraulic unit are integrally formed with the mounting bracket.
Figure 13:
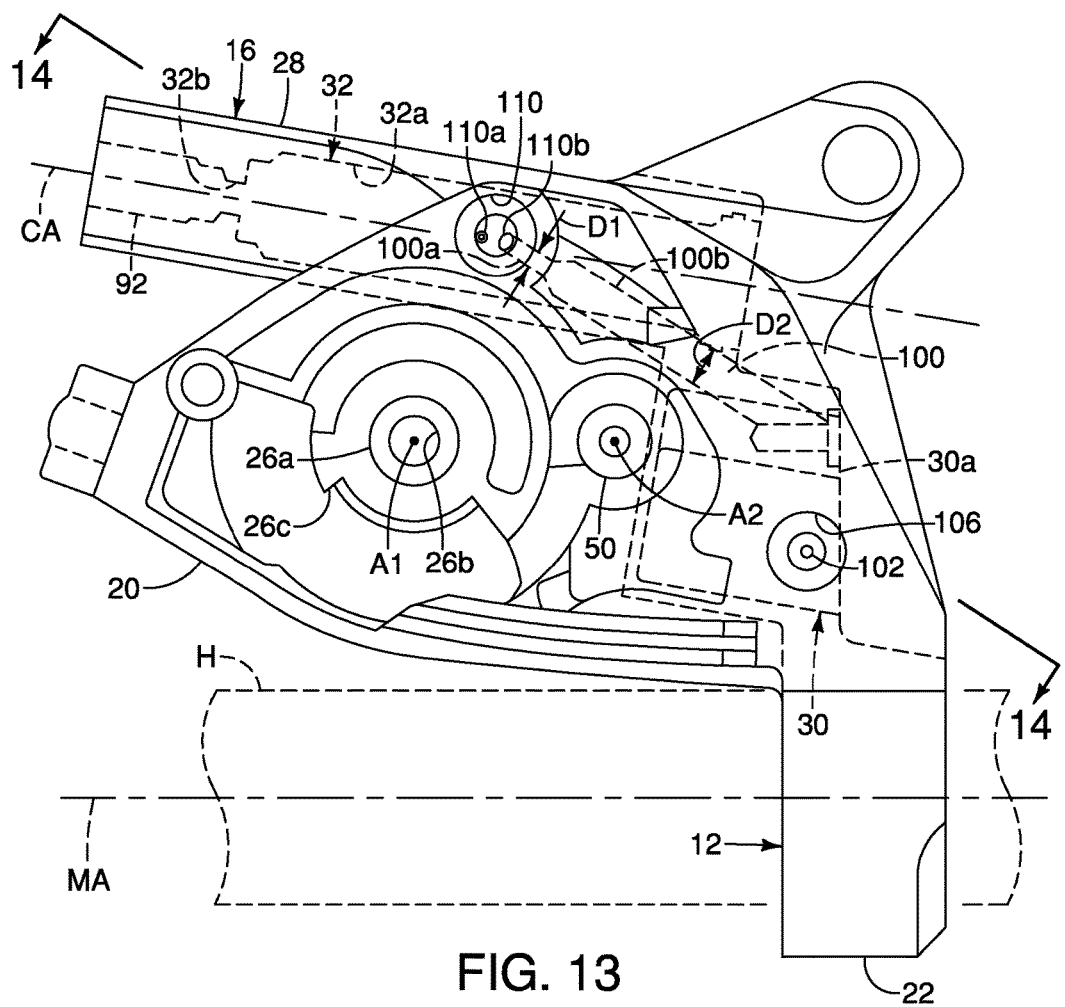
FIG. 13 is an enlarged top elevational view of the mounting bracket of the bicycle control device illustrated in FIGS. 1 to 4 illustrating portions of the hydraulic unit that are integrally formed with the mounting bracket.

As best seen in FIGS. 5 to 8, the shift unit 14 is provided on the mounting bracket 12. Likewise, as best seen in FIGS. 7 to 13, the hydraulic unit 16 is also provided on the mounting bracket 12. In this illustrated embodiment, the shift unit 14 and the hydraulic unit 16 are partially integrally formed with the handlebar clamp 22 of the mounting bracket 12. In particular, the mounting bracket 12 further includes a shift unit support portion 26 that is formed by the mounting bracket 12. In addition, the hydraulic unit 16 includes a cylinder housing 28 and a hydraulic reservoir 30 that are formed by the mounting bracket 12. The cylinder housing 28 defines a cylinder bore 32 that is provided to the mounting bracket 12. Preferably, the mounting bracket 12 is a one-piece member that defines the shift unit support portion 26 and the cylinder housing 28 as best seen in FIGS. 6 and 12. The mounting bracket 12 is a one-piece member that further defines the hydraulic reservoir 30 as seen in FIGS. 4 and 9 to 13. Preferably, as seen in FIGS. 9 and 11, the hydraulic reservoir 30 have sidewalls that are parallel to a cylinder axis CA of the cylinder bore 32. Conversely, as seen in FIG. 13, the handlebar mounting axis MA is not parallel to the cylinder axis CA. In particular, the cylinder axis CA diverges away from the handlebar mounting axis MA as the cylinder axis CA extends in a second direction B2 away from the handlebar clamp 22.

Turning now to FIGS. 5 to 8, the shift unit 14 will now be discussed in more detail. Here, the shift unit 14 pulls and releases the inner wire 18b with respect to the shift unit support portion 26 of the mounting bracket 12. The shift unit support portion 26 is provided with a conventional barrel adjuster 33 for adjusting a contact point of the outer casing 18a relative to the mounting bracket 12. Thus, the shift unit 14 includes a wire take-up member 34. The wire take-up member 34 is movably provided on the shift unit support portion 26 of the mounting bracket 12. In particular, the shift unit support portion 26 pivotally supports the wire take-up member 34. As explained below, the wire take-up member 34 is selectively held in a plurality of predetermined positions that establish a plurality of gear shift positions. The wire take-up member 34 has a wire fixing structure 34a for fixing one end of the inner wire 18b thereto. Here, the wire fixing structure 34a is a bore in which the inner wire 18b is inserted through such that an abutment on the inner wire 18b contacts the wire take-up member 34 to retain the inner wire 18b on the wire take-up member 34.

As seen in FIG. 5, the shift unit 14 further includes a cover 36 that is attached to the mounting bracket 12 to house the wire take-up member 34. In other words, the shift unit 14 is partially concealed between the shift unit support portion 26 of the mounting bracket 12 and the cover 36. In the illustrated embodiment, the wire take-up member 34 is provided with a gear position indicator 38. The gear position indicator 38 is attached to the wire take-up member 34 and is visible through a transparent lens portion 36a of the cover 36. In this way, a rider can easily determine a current gear shift position of the shift unit 14.

In the illustrated embodiment, the wire take-up member 34 is pivotable about a take-up axis A1. Preferably, the wire take-up member 34 of the shift unit 14 is entirely disposed between the handlebar mounting axis MA and the cylinder axis CA as viewed along a first direction B1 parallel to the take-up axis A1 of the wire take-up member 34. In the illustrated embodiment, as seen in FIGS. 7 and 8, the shift unit support portion 26 of the mounting bracket 12 has a tubular post 26a that pivotally supports the wire take-up member 34. Also as seen in FIGS. 7 and 8, the shift unit 14 includes a main axle 42. The main axle 42 extends through the tubular post 26a for positioning the wire take-up member 34 to the shift unit support portion 26 of the mounting bracket 12. The main axle 42 defines the take-up axis A1. Here, the main axle 42 is in the form of a mounting bolt having a shaft 42a with an external thread. The main axle 42 extends through a bore 26b of the tubular post 26a. A fixing nut 44 is screwed onto the shaft 42a to fix the main axle 42 to the shift unit support portion 26 of the mounting bracket 12. Preferably, a washer 46 is provided on the shaft 42a to prevent the fixing nut 44 from loosening. A stationary support plate or member 48 non-rotatably supports the upper end of the main axle 42. The stationary support plate 48 is mounted on a support post 50 that is fixed to the shift unit support portion 26 of the mounting bracket 12. A C-shaped retaining clip 52 is attached to the free end of the support post 50 to retain the stationary support plate 48 on the support post 50.

As seen in FIGS. 7 and 8, a biasing element 54 is operatively coupled between the wire take-up member 34 and the stationary support plate 48 for biasing the wire take-up member 34 in a releasing direction (clockwise about the take-up axis A1 in FIG. 6). Here, in the illustrated embodiment, the biasing element 54 is a torsion spring that has a coiled portion coiled about the main axle 42. A first end of the biasing element 54 is disposed in a hole in the wire take-up member 34, while a second end of the biasing element 54 is hooked on the stationary support plate 48. Preferably, the biasing element 54 is preload in a fully released or fully unwound position.

As seen in FIGS. 7 and 8, in order to selectively establish the gear shift positions, the shift unit 14 further includes a positioning member 56 and a position maintaining member 58. In the illustrated embodiment, the positioning member 56 is a plate that is non-rotatably mounted on the wire take-up member 34. In this way, the wire take-up member 34 and the positioning member 56 rotate together as a unit about the take-up axis A1. The positioning member 56 includes a plurality of positioning abutments or teeth 56a for engagement with the position maintaining member 58. The position maintaining member 58 is a pawl that is pivotally supported on the support post 50. A biasing element or spring 60 biases the position maintaining member 58 towards engagement with the positioning member 56 (counterclockwise about the support post 50 in FIG. 6). The biasing element 60 is a torsion spring having a coiled portion coiled around the support post 50. A first end of the biasing element 60 is engaged with the shift unit support portion 26 of the mounting bracket 12, while a second end of the biasing element 60 is engaged with the position maintaining member 58. The position maintaining member 58 has a holding abutment or holding pawl 58a that selectively contacts the positioning abutments 56a of the positioning member 56 to hold the wire take-up member 34 and the positioning member 56 from rotating while the parts of the shift unit 14 are in their rest positions. In this way, the position maintaining member 58 moves with respect to the mounting bracket 12 to move between a holding (rest) position that holds the wire take-up member 34 in one of a plurality of predetermined positions and a releasing position that releases the wire take-up member 34 for pivotal movement. With the wire take-up member 34 in the rest position, the position maintaining member 58 abuts against one of the positioning abutments 56a with the holding or positioning pawl 58a. The position maintaining member 58 has a motion limiting abutment or pawl 58b that moves into the path of the positioning abutments 56a when the position maintaining member 58 is pivoted to the releasing position. In this way, the positioning member 56 is prevented from pivoting to more than one of the predetermined positions during a releasing operation. The position maintaining member 58 further has a tab or abutment 58c that is used for pivoting the position maintaining member 58 on the support post 50 in response to a releasing operation as explained later.

As seen in FIGS. 1 to 6, the shift unit 14 further includes a first operating lever 61 and a second operating lever 62. Basically, the first operating lever 61 is used for pivoting the wire take-up member 34 to pull the inner wire 18b towards the mounting bracket 12, while the second operating lever 62 is used for pivoting the wire take-up member 34 to release the inner wire 18b to pay out from the mounting bracket 12. In the illustrated embodiment, the first operating lever 61 is pivotally disposed about a first operating axis. The first operating axis is coincident with the take-up axis A1 of the wire take-up member 34. Thus, the take-up axis A1 of the wire take-up member 34 can also be referred to the first operating axis A1 of the first operating lever 61. In the illustrated embodiment, the second operating lever 62 is pivotally disposed about a second operating axis A2 that is offset from the first operating axis A1 of the first operating lever 61. The support post 50 (FIG. 12) pivotally supports the second operating lever 62 and defines the second operating axis A2.

As explained below, the first and second operating levers 61and 62 are each biased to a rest position and moved by a rider from rest position to an operated position to perform a shifting operation. The term "rest position" as used herein refers to a state in which a movable part (e.g., the first operating lever 61 or the second operating lever 62) remains stationary without the need of a user intervening (e.g., holding the movable part) in the state corresponding to the rest position. Thus, the term "rest position" can also be referred to as a non-operated position. The term "end position" as used herein refers to a state in which a movable part (e.g., the first operating lever 61 or the second operating lever 62) is prevented from be moved further from the rest position in a movement direction of a movement stroke of that movable part. The term "operated position" as used herein refers to a state in which a movable part (e.g., the first operating lever 61 or the second operating lever 62) is moved from the rest position to a position as a result of an external force being applied to the movable part.

Basically, as seen in FIG. 7, the first operating lever 61 includes a mounting portion 61a and a user operating portion 61b. Here, the first operating lever 61 further includes a connecting portion 61c that interconnects the mounting portion 61a and the user operating portion 61b. The first operating lever 61 is movably disposed with respect to the mounting bracket 12 between a non-operated position and an operated position for pivoting the wire take-up member 34 to pull the inner wire 18b towards the mounting bracket 12. The first operating lever 61 is movably disposed along a first operating plane P1. In this disclosure, since the overall shape of the first operating lever 61 is not straight and does not lie in a single plane, the first operating plane P1 is defined by the mounting portion 61a, which is pivotally supported on the main axle 42.

Basically, the first operating lever 61 is pivotally disposed with respect to the mounting bracket 12 about the first operating axis A1 between the non-operated position and the operated position. As seen in FIGS. 7 and 8, a return spring 64 or other biasing element is operatively coupled between the first operating lever 61 and the shift unit support portion 26 of the mounting bracket 12 for biasing the first operating lever 61 towards the non-operated position, which is a rest position of the first operating lever 61. The return spring 64 is a torsion spring having a coiled portion coiled around the main axle 42. A first end of the return spring 64 is engaged with the shift unit support portion 26 of the mounting bracket 12, while a second end of the return spring 64 is engaged with the first operating lever 61. In this way, the first operating lever 61 is a trigger lever that returns to the non-operated position (clockwise about the first operating axis A1 in FIG. 6) after being pivoted from the non-operated position to an operated position and then released.

As seen in FIGS. 7 and 8, in the illustrated embodiment, the first operating lever 61 is provided with a pulling member 66 for rotating the wire take-up member 34 to pull the inner wire 18b into a shift unit housing that is defined by the shift unit support portion 26 of the mounting bracket 12 and the cover 36. The pulling member 66 is pivotally supported on the first operating lever 61 by a pivot post 68. The pulling member 66 has a driving pawl 66a that engages the positioning member 56. In particular, the positioning member 56 has a plurality of pulling abutments or teeth 56b. A biasing element or spring 70 biases the pulling member 66 towards engagement with one of the pulling abutments 56b of the positioning member 56. However, when the first operating lever 61 is in the rest position, the driving pawl 66a of the pulling member 66 contacts an abutment 26c (shown in FIGS. 12 and 13) of the shift unit support portion 26. In this way, the driving pawl 66a of the pulling member 66 is prevented from contacting the pulling abutments 56b of the positioning member 56 while the first operating lever 61 is in the rest position. Once the first operating lever 61 is rotated in a wire pulling direction (i.e., a clockwise direction about the first operating axis A1 in FIGS. 5 to 7), the driving pawl 66a moves off the abutment 26c of the shift unit support portion 26 into engagement with one of the pulling abutments 56b of the positioning member 56 due to the biasing force of the biasing element 70. Here, the biasing element 70 is a torsion spring having a coiled portion coiled around a pivot post 68. A first end of the biasing element 70 is engaged with the pulling member 66, while a second end of the biasing element 70 is engaged with the first operating lever 61. As seen in FIGS. 7 and 8, a cover or bottom cover 72 is attached to the mounting portion 61a of the first operating lever 61 to cover the pulling member 66 and the biasing element 70.

Still referring to FIGS. 7 and 8, basically, the second operating lever 62 includes a mounting portion 62a and a user operating portion 62b. The second operating lever 62 further includes an operating abutment 62c extending from the mounting portion 62a. The operating abutment 62c is arranged to contact the abutment 58c of the position maintaining member 58 to move the position maintaining member 58 from the holding position to the releasing position as the second operating lever 62 is operated from the non-operated position to the operated position. In other words, as the second operating lever 62 is operated from the non-operated position to the operated position, the operating abutment 62c contacts the abutment 58c of the position maintaining member 58 to pivot the position maintaining member 58 from the holding position to the releasing position for momentarily disengaging the position maintaining member 58 from one of the positioning abutments 56a.

The second operating lever 62 is movably disposed along a second operating plane P2. In particular, the second operating lever 62 is pivotally disposed with respect to the mounting bracket 12 about the second operating axis A2 between the non-operated position and the operated position. In this embodiment the second operating plane P2 is parallel to the first operating plane P1 as seen in FIG. 8. As seen in FIGS. 7 and 8, a return spring 74 or other biasing element is operatively coupled between the second operating lever 62 and the shift unit support portion 26 of the mounting bracket 12 for biasing the second operating lever 62 towards the non-operated position, which is a rest position of the second operating lever 62. The return spring 74 is a torsion spring having a coiled portion coiled around the support post 50. A first end of the return spring 74 is engaged with the shift unit support portion 26 of the mounting bracket 12, while a second end of the return spring 74 is engaged with the second operating lever 62. In this way, the second operating lever 62 is a trigger lever that returns to the non-operated position (clockwise about the second operating axis A2 in FIG. 6) after being pivoted from the non-operated position to an operated position and then released.

In this disclosure, since the overall shape of the second operating lever 62 is not straight and does not lie in a single plane, the second operating plane P2 is defined by the mounting portion 62a, which is pivotally supported on the support post 50. The second operating lever 62 is movably disposed with respect to the mounting bracket 12 between a non-operated position and an operated position for releasing the wire take-up member 34 under the biasing force of the biasing element 54. As a result of the pivoting of the wire take-up member 34 under the biasing force of the biasing element 54, the inner wire 18b pays out from the mounting bracket 12.

Now, the hydraulic unit 16 will be discussed in more detail with reference mainly to FIGS. 9 to 13. As mentioned above, the hydraulic unit 16 includes the cylinder housing 28 and the hydraulic reservoir 30. In the illustrated embodiment, the hydraulic reservoir 30 is at least partially disposed between the first operating plane P1 and the second operating plane P2. More preferably, at least a majority of the hydraulic reservoir 30 is disposed between the first operating plane P1 and the second operating plane P2.

The hydraulic unit 16 further includes a piston 80 that is movably disposed in the cylinder housing 28 along the cylinder axis CA of the cylinder bore 32. Thus, the hydraulic unit 16 mainly includes the cylinder housing 28, the hydraulic reservoir 30 and the piston 80. In the illustrated embodiment, the hydraulic unit 16 further includes a hydraulic operating lever 82. The hydraulic operating lever 82 is operatively coupled to the piston 80 by a connecting rod 84. The hydraulic operating lever 82 is movably mounted to the mounting bracket 12 to move from a rest position to an operated position to perform a braking operation. Here, the hydraulic operating lever 82 is pivotally mounted to the mounting bracket 12 by a pivot pin 86 that defines pivot axis A3. The hydraulic operating lever 82 is movably disposed along a hydraulic operating plane P3 to move the piston 80 within the cylinder bore 32 along the cylinder axis CA of the cylinder bore 32. Preferably, the hydraulic operating plane P3 passes through the cylinder bore 32 and the hydraulic reservoir 30. Also preferably, the hydraulic operating plane P3 passes through the shift unit 14. More specifically, the hydraulic operating plane P3 passes through the shift unit 14 such that the hydraulic operating plane P3 intersects the main axle 42. Here, the hydraulic operating plane P3 passes through the cylinder bore 32, the hydraulic reservoir 30 and the shift unit 14. In the illustrated embodiment, the hydraulic operating plane P3 preferably also passes through a handlebar receiving opening 22a defined by the handlebar clamp 22. Moreover, the cylinder axis CA lies in the hydraulic operating plane P3. Also, the hydraulic operating plane P3 is disposed closer to the first operating plane P1 than the second operating plane P2. In the illustrated embodiment, the first operating plane P1 and the hydraulic operating plane P3 are coincident. Alternatively, the hydraulic operating plane P3 can be disposed between the first and second operating planes P1 and P2.

As best seen in FIG. 9, the piston 80 is slidably disposed in the cylinder bore 32 along the cylinder axis CA. The piston 80 is provided with a first annular sealing ring 88a and a second annular sealing ring 88b. The connecting rod 84 has a first end 84a pivotally connected to the piston 80. The connecting rod 84 has a second end 84b pivotally connected to the hydraulic operating lever 82 by a trunnion 90. Preferably, the second end 84b of the connecting rod 84 is adjustably connected to the trunnion 90 for adjusting the rest position of the hydraulic operating lever 82.

As best seen in FIGS. 9 and 13, the cylinder bore 32 has a piston receiving portion 32a and an outlet port 32b. The cylinder housing 28 has a threaded bore 92 that fluidly communicates with the outlet port 32b. The hydraulic hose 20 is connected to the cylinder housing 28 by a hydraulic hose fitting 94 that is screwed into the threaded bore 92. The piston receiving portion 32a slidably receives the piston 80 for forcing the hydraulic fluid out though the outlet port 32b and into the hydraulic hose 20. In the illustrated embodiment, the cylinder bore 32 is at least partially disposed between the first operating plane P1 and the second operating plane P2. More preferably, at least half of the cylinder bore 32 is disposed between the first operating plane P1 and the second operating plane P2. Also the hydraulic operating plane P3 is coincident with the first operating plane P1.

Figure 10:
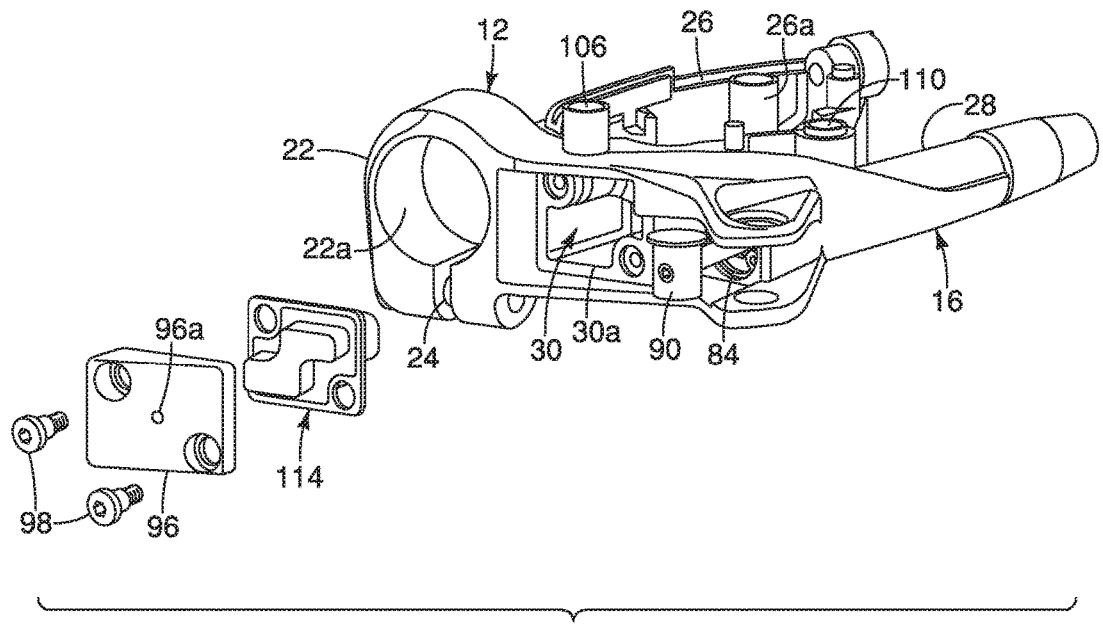
FIG. 10 is a partially exploded perspective view of selected parts of the bicycle control device illustrated in FIGS. 1 to 4 showing a reservoir lid and a diaphragm for the hydraulic reservoir of the hydraulic unit.

As best seen in FIGS. 9, 10 and 13, the mounting bracket 12 has an integrated fluid reservoir tank that defines the hydraulic reservoir 30. Preferably, the hydraulic reservoir 30 is entirely disposed between the handlebar mounting axis MA and the cylinder axis CA as viewed along the first direction B1. The hydraulic reservoir 30 has an opening 30a. The bicycle control device 10 further comprises a reservoir lid 96 that is provided for closing the opening 30a of the hydraulic reservoir 30. The reservoir lid 96 is attached to the mounting bracket 12 by a pair of screws 98. Preferably, the reservoir lid 96 is made of a rigid material such as a resin material or a lightweight metallic material.

Figure 14:
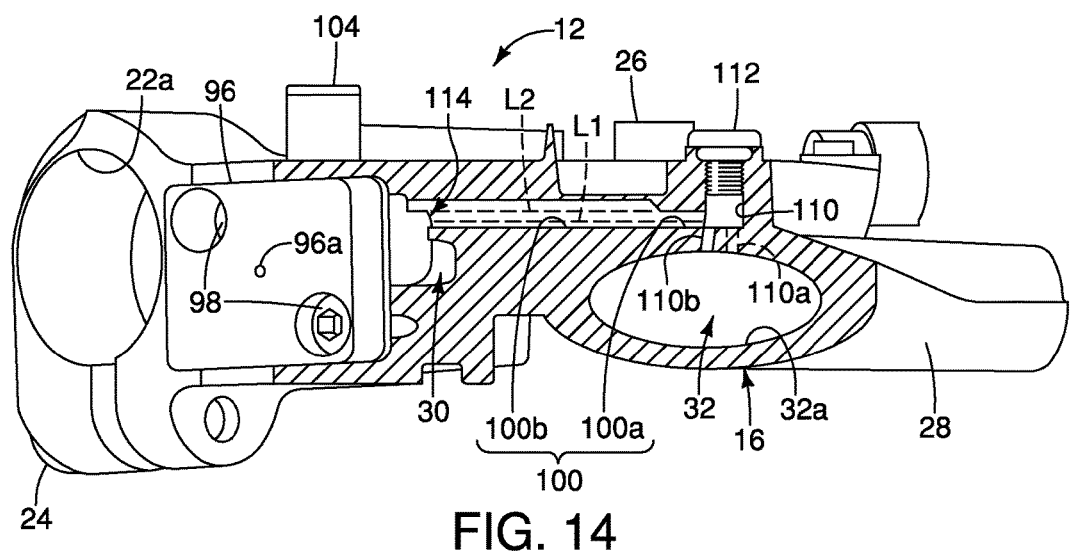
FIG. 14 is a cross sectional view of the mounting bracket as seen along section line 14-14 of FIG. 13.

As seen in FIGS. 13 and 14, the hydraulic reservoir 30 is fluidly connected to the cylinder bore 32. In particular, the hydraulic unit 16 further includes a fluid passage 100 fluidly connecting the cylinder bore 32 to the hydraulic reservoir 30. The fluid passage 100 includes a first portion 100a having a first diameter D1 and a second portion 100b having a second diameter D2. The first diameter D1 is smaller than the second diameter D2. The first portion 100a is disposed closer to the cylinder bore 32 than the second portion 100b. In the illustrated embodiment, the second diameter D2 is twice the first diameter D1. For example, the second diameter D2 is four millimeters, while the first diameter D1 is two millimeters in the illustrated embodiment. Also the first portion 100a defines a first axis L1 and the second portion 100b defines a second axis L2. The second axis L2 extends in a same direction as the first axis L1. In the illustrated embodiment, the first axis L1 of the first portion 100a is located closer to the cylinder bore 32 than the second axis L2 of the second portion 100b. The first axis L1 is parallel to the second axis L2. Preferably, the first axis L1 is offset from the second axis L2. By having the first axis L1 offset from the second axis L2, any bubbles existing in the hydraulic fluid will break into smaller sizes bubbles as the hydraulic fluid flows during the bleeding process due to an increase in pressure of the hydraulic fluid. In particular, as the hydraulic fluid flows from the first portion 100a to the second portion 100b during the bleeding process, the pressure in the hydraulic fluid increases as the hydraulic fluid flows from the first portion 100a to the second portion 100b. In this way, a smooth bleeding process can be reliably carried out. The fluid passage 100 is disposed between the first operating plane P1 and the second operating plane P2 without intersecting with at least one of the first operating plane P1 and the second operating plane P2. More preferably, the fluid passage 100 is entirely disposed between the first operating plane P1 and the second operating plane P2. The handlebar clamp 22 is disposed such that the handlebar mounting axis MA is located between the first and second operating planes P1 and P2 as seen in FIG. 4.

As seen in FIG. 13, the mounting bracket 12 includes a bleed port 102 that is fluidly connected to the hydraulic reservoir 30. A bleed screw 104 is screwed into a threaded bore 106 of the mounting bracket 12 to selectively open and close the bleed port 102. As best seen in FIGS. 12 and 13, the bleed port 102 and the bleed screw 104 are entirely disposed between the handlebar mounting axis MA and the cylinder axis CA as viewed along the first direction B1. The cover 36 overlies the bleed screw 104 and the bleed port 102 that is fluidly connected to the hydraulic reservoir 30.

As seen in FIG. 13, the mounting bracket 12 is preferably provided with an opening 110 that fluidly communicates with a remote end of the fluid passage 100 with respect to the hydraulic reservoir 30. The opening 110 fluidly communicates with the cylinder bore 32 via a first inlet port 110a and a second inlet port 110b. The first inlet port 110a is in fluid communication with the piston receiving portion 32a of the cylinder bore 32 between the first annular sealing ring 88a and the outlet port 32b while the hydraulic operating lever 82 is in the rest position. The second inlet port 110b is in fluid communication with the piston receiving portion 32a of the cylinder bore 32 at the second annular sealing ring 88b while the hydraulic operating lever 82 is in the rest position. A plug 112 is inserted into the opening 110 to close the opening 110.

In the illustrated embodiment, as seen in FIG. 9, the bicycle control device 10 further comprises a diaphragm 114 that is at least partially disposed between the hydraulic reservoir 30 and the reservoir lid 96 to divide the hydraulic reservoir 30 into an air chamber C1 and a hydraulic fluid chamber C2. The diaphragm 114 is a flexible, resilient member made of a suitable material such as a rubber material. The diaphragm 114 is a unitary, one-piece member. In the illustrated embodiment, the reservoir lid 96 has an air passageway 96a connecting the air chamber C1 to outside of the mounting bracket 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control device. Accordingly, these directional terms, as utilized to describe the bicycle control device should be interpreted relative to a bicycle in an upright riding position on a horizontal surface and that is equipped with the bicycle control device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
    a mounting bracket including a handlebar clamp defining a handlebar receiving opening with a handlebar mounting axis;
    a hydraulic unit provided on the mounting bracket and including a cylinder housing defining a cylinder bore, a hydraulic reservoir fluidly connected to the cylinder bore, and a piston movably disposed in the cylinder bore along a cylinder axis of the cylinder bore; and
    a shift unit provided on the mounting bracket and including a wire take-up member pivotable about a take-up axis, wherein
    the wire take-up member of the shift unit and the hydraulic reservoir are disposed between the handlebar mounting axis and the cylinder axis as viewed along a first direction parallel to the take-up axis of the wire take-up member.

2. The bicycle control device according to claim 1, wherein
    the handlebar mounting axis is not parallel to the cylinder axis.

3. The bicycle control device according to claim 2, wherein
    the cylinder axis diverges away from the handlebar mounting axis as the cylinder axis extends in a second direction away from the handlebar clamp.

4. The bicycle control device according to claim 1, wherein
    the hydraulic unit further includes a hydraulic operating lever movably disposed along a hydraulic operating plane to move the piston within the cylinder bore.

5. The bicycle control device according to claim 4, wherein
    the shift unit includes a first operating lever movably disposed along a first operating plane, and a second operating lever movably disposed along a second operating plane, and
    the hydraulic operating plane is disposed closer to the first operating plane than the second operating plane.

6. The bicycle control device according to claim 5, wherein
    the second operating plane is parallel to the first operating plane.

7. The bicycle control device according to claim 4, wherein
    the hydraulic operating plane passes through the cylinder bore and the hydraulic reservoir.

8. The bicycle control device according to claim 7, wherein
    the hydraulic operating plane passes through the shift unit.

9. The bicycle control device according to claim 8, wherein
    the hydraulic operating plane passes through the handlebar receiving opening of the handlebar clamp.

10. The bicycle control device according to claim 1, wherein
    the shift unit includes a first operating lever movably disposed along a first operating plane, and a second operating lever movably disposed along a second operating plane, and
    the hydraulic reservoir is at least partially disposed between the first operating plane and the second operating plane.

11. The bicycle control device according to claim 10, wherein
    the cylinder bore is at least partially disposed between the first operating plane and the second operating plane.

12. The bicycle control device according to claim 11, wherein
    a majority of the hydraulic reservoir and at least half of the cylinder bore are disposed between the first operating plane and the second operating plane.

13. The bicycle control device according to claim 10, wherein the first operating lever is pivotally disposed about a first operating axis, and the second operating lever is pivotally disposed about a second operating axis that is offset from the first operating axis of the first operating lever.

14. The bicycle control device according to claim 13, wherein the first operating axis is coincident with the take-up axis.

15. The bicycle control device according to claim 1, wherein the mounting bracket further includes a shift unit support portion that pivotally supports the wire take-up member.

16. The bicycle control device according to claim 15, wherein the mounting bracket is a one-piece member that defines the shift unit support portion and the cylinder housing.

17. The bicycle control device according to claim 16, wherein the mounting bracket is a one-piece member that further defines the hydraulic reservoir.

18. The bicycle control device according to claim 16, wherein the mounting bracket is a one-piece member that further defines the handlebar clamp.

19. The bicycle control device according to claim 1, wherein the mounting bracket includes a bleed port that is fluidly connected to the hydraulic reservoir.

20. The bicycle control device according to claim 19, wherein the bleed port is entirely disposed between the handlebar mounting axis and the cylinder axis as viewed along the first direction.

21. The bicycle control device according to claim 19, further comprising a cover attached to the mounting bracket to house the wire take-up member and to overlie the bleed port.

22. The bicycle control device according to claim 1, further comprising a reservoir lid closing an opening of the hydraulic reservoir.

23. The bicycle control device according to claim 22, further comprising a diaphragm at least partially disposed between the hydraulic reservoir and the reservoir lid to divide the hydraulic reservoir into an air chamber and a hydraulic fluid chamber.

24. The bicycle control device according to claim 23, wherein the reservoir lid has an air passageway connecting the air chamber to outside of the mounting bracket.

25. A bicycle control device comprising:

a mounting bracket;

a hydraulic unit provided on the mounting bracket and including a cylinder housing defining a cylinder bore, a hydraulic reservoir fluidly connected to the cylinder bore, a piston movably disposed in the cylinder bore along a cylinder axis of the cylinder bore, and a hydraulic operating lever movably disposed along a hydraulic operating plane to move the piston within the cylinder bore; and a shift unit provided on the mounting bracket, wherein the hydraulic operating plane passes through the cylinder bore, the hydraulic reservoir and the shift unit.

26. The bicycle control device according to claim 25, wherein the shift unit includes a main axle defining a take-up axis, and a wire take-up member pivotable about the take-up axis, and the hydraulic operating plane intersects with the main axle.

27. The bicycle control device according to claim 25, wherein the mounting bracket includes a handlebar clamp defining a handlebar receiving opening with a handlebar mounting axis, and the hydraulic operating plane passes through the handlebar receiving opening of the handlebar clamp.

28. A bicycle control device comprising:

a mounting bracket including a handlebar clamp defining a handlebar receiving opening with a handlebar mounting axis;

a shift unit including a first operating lever movably disposed along a first operating plane and a second operating lever movably disposed along a second operating plane; and a hydraulic unit including a cylinder housing defining a cylinder bore provided to the mounting bracket, a hydraulic reservoir, a piston movably disposed in the cylinder bore along a cylinder axis of the cylinder bore, and a fluid passage fluidly connecting the cylinder bore to the hydraulic reservoir, the fluid passage being disposed between the first operating plane and the second operating plane without intersecting with at least one of the first operating plane and the second operating plane.

29. The bicycle control device according to claim 28, wherein the fluid passage includes a first portion having a first diameter and a second portion having a second diameter, the first diameter is smaller than the second diameter.

30. The bicycle control device according to claim 29, wherein the first portion is disposed closer to the cylinder bore than the second portion.

31. The bicycle control device according to claim 29, wherein the first portion defines a first axis and the second portion defines a second axis extending in a same direction as the first axis, and the first axis of the first portion is located closer to the cylinder bore than the second axis of the second portion.

32. The bicycle control device according to claim 31, wherein the first axis is parallel to the second axis and offset from the second axis.

33. A bicycle control device comprising:

a mounting bracket including a handlebar clamp defining a handlebar receiving opening with a handlebar mounting axis;

a hydraulic unit including a cylinder housing defining a cylinder bore provided to the mounting bracket, a hydraulic reservoir fluidly connected to the cylinder bore, and a piston movably disposed in the cylinder bore along a cylinder axis of the cylinder bore; and a shift unit including a first operating lever movably disposed along a first operating plane and a second operating lever movably disposed along a second operating plane, a majority of the hydraulic reservoir being disposed between the first operating plane and the second operating plane.

* * * * *